March 2, 1965 C. E. SAGNESS 3,171,137
COLOSTOMY IRRIGATION APPARATUS
Filed Nov. 13, 1962
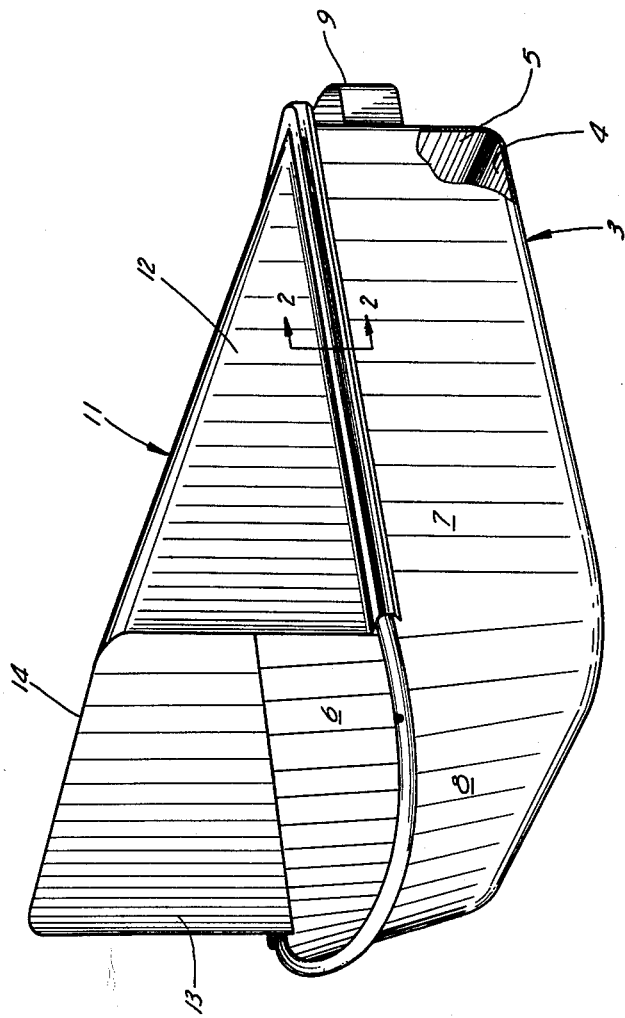
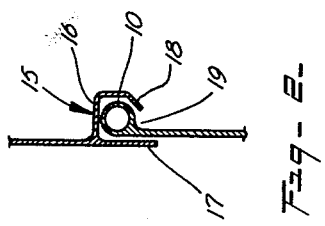
INVENTOR.
CLARA E. SAGNESS
BY
Schroeder & Siegfried
ATTORNEYS

3,171,137
COLOSTOMY IRRIGATION APPARATUS
Clara E. Sagness, Glencoe, Minn.
Filed Nov. 13, 1962, Ser. No. 237,019
6 Claims. (Cl. 4—112)

This invention relates to colostomy irrigation apparatus. More particularly, it relates to a device designed for use in the irrigation of colostomy patients so as to facilitate the irrigation process without the normally attendant soiling of bedclothes and the like.

Nurses and hospital employees find it extremely difficult to irrigate colostomy patients without soiling bedclothes and general messiness while the services are being performed. In such an operation, the patient is normally irrigated or flushed by forcing water into the interior of the patient through the colostomy opening. Frequently the irrigated material gushes outwardly from the opening subsequent to the irrigation with the result that the patient's clothes, the bedclothes, and even the clothes of the person administering the irrigation are soiled. The patient is unable to control such activities and consequently the entire irrigation process has heretofore been both unpleasant and unnecessarily messy. My invention is directed toward overcoming this unsatisfactory condition.

It is a general object of my invention to provide a novel and improved colostomy irrigation apparatus which is simple and inexpensive in construction and yet highly efficient to prevent splashing and the like during the irrigation process.

A more specific object is to provide a novel and improved receptacle for use in performing the irrigation service which is so constructed and designed as to eliminate soiling of the bedclothes and the clothes of the patient as well as the clothes of the attendant.

Another object is to provide a novel and improved colostomy irrigation device constructed and designed to effectively prevent splashing of the irrigated material during the irrigation process and to be quickly and easily cleaned.

A further object is to provide a novel and improved irrigation device which can be manufactured and sold inexpensively.

These and other objects and advantages of my invention will more fully appear from the following description, made in connection with the accompanying drawings, wherein like reference characters refer to the same or similar parts throughout the several views and in which:

FIG. 1 is a perspective view of my colostomy irrigation apparatus; and

FIG. 2 is a sectional view taken along line 2—2 of FIG. 1.

One embodiment of my invention is shown in FIGS. 1-2. As shown, it includes a receptacle or pan 3 having a bottom wall 4, a rear wall 5 and opposite upright side walls 6 and 7. As shown, it also includes a forward wall 8 which extends upwardly and forwardly from the bottom wall 3. A handle member 9 is carried by the rear wall 5. As best shown in FIG. 2, the upper edges of the side walls 6 and 7 and the forward wall 8 and the rear wall 5 are formed into a peripherally extending bead 10.

Resiliently secured to the upper edges of the side walls 6 and 7 and the rear wall 5 is a hood member 11. As shown, this hood member is comprised of opposite side walls 12 and 13 and an upwardly and forwardly sloping top wall 14. It will be noted that the two side walls 12 and 13 as well as the top wall 14 terminate short of the forward wall 8.

The lower edges of the side walls 12 and 13 and the rear edge of the top wall 14 are constructed in the form of a continuous inverted U-shaped channel best shown in FIG. 2 and identified by the numeral 15. This channel member 15 is continuous and has a bottom 16 and mouth-defining portions 17 and 18 which define the mouth 19 of the channel. Reference to FIG. 2 shows that the mouth-defining portions 17 and 18 are more closely spaced than the portions which define the bottom 16 and are spaced a lesser distance than the diameter of the bead 10. Consequently, it is necessary for the mouth-defining portions to be spread in order for the bead 10 to be inserted therein.

My entire device is preferably molded from a plastic material such as polyethylene. Such material is inherently resilient so that the mouth-defining portions 17 and 18 will readily spread upon pressure being applied thereto. As a consequence, the hood member 11 can be readily applied to the upper edges of the receptacle 3 by merely placing the hood directly above the position shown and pressing downwardly thereupon. Such pressure will cause the bead 10 to spread the mouth-defining portions 17 and 18 so that the hood member 11 will snap into engaging relation with upper edges of the receptacle 3. When it is desired to clean the device, the hood member can be very easily pulled upwardly free of the receptacle so that the two elements of the device can be cleaned separately.

In use the hood member 11 is snapped into position shown in FIG. 1 and the receptacle 3 is pressed against the side of the patient immediately above the hip bone so that the upper edge of the forward wall 8 will bear against the body of the patient immediately below the colostomy opening. The irrigation tube is then inserted into the patient and the patient is irrigated. When the irrigated material is forced outwardly by the patient it will be trapped in the hooded receptacle 3 and the hood member 11 will positively preclude splashing of the irrigated material. As a consequence, the clothes of the patient and the bedclothes will not be soiled and the attendant likewise will avoid having her clothes soiled from splashing of the irrigated material.

I have found that the sloping forward wall 8 when pressed against the body of the patient can be forced inwardly into snug position and when this is done the hood member 11 is in very close proximity to the surrounding area of the patient's body. In this manner it is almost impossible for the irrigated material to escape the confines of my colostomy irrigation apparatus. Moreover, once the irrigation service has been performed, it is a simple matter to empty the receptacle 3, thereafter separate the hood member 11 from the receptacle, and separately wash the two elements of the device.

I have found that the receptacle 3 and the hood member 11 can be manufactured of molded plastic material and when this is done the two elements of the apparatus can be manufactured and sold very inexpensively. Moreover, this device fulfills a need which has long existed in hospitals and in the homes of colostomy patients. The apparatus shown is easy to assemble and disassemble and is likewise easy to apply and utilize during the irrigation activities.

It will, of course, be understood that various changes may be made in the form, details, arrangement and proportions of the parts without departing from the scope of my invention which consists of the matter shown and described herein and set forth in the appended claims.

What is claimed is:
1. Colostomy irrigation apparatus comprising:
   (a) a generally rectangularly shaped receptacle having an imperforate bottom and upright side and rear walls extending upwardly from said bottom and a forward wall extending upwardly and forwardly from said bottom, each of said walls having upper edges, and said forward wall extending upwardly to an elevation approximating that of the upper edges of said side and rear walls and terminating thereat, and (b) removable hood structure superimposed on said receptacle in engaging relation with said side and rear walls, (c) said hood structure terminating adjacent to but short of the major portion of the upper edge of said forward wall to provide an opening for the entrance of the irrigated material of a colostomy into said receptacle, (d) said hood structure cooperatively engaging the upper edges of said side and rear walls to effectively prevent any of the irrigated material received within the said receptacle from splashing over the sides of said receptacle.

2. The structure defined in claim 1 and (e) cooperative positive engaging means carried by said hood structure and the upper edges of said side and rear walls of said receptacle for positively securing said hood structure to said receptacle in splash-preventing relation.

3. The structure defined in claim 1, and (e) resilient engagement means carried by the lower edge portions of said hood structure for positively engaging the upper edges of said side and rear walls.

4. The structure defined in claim 1 wherein, (e) said hood structure is comprised of a single integrally formed member made of resilient material and having a resiliently walled downwardly facing channel extending along its lower edges and resiliently clamping the upper edges of said side and rear walls of said receptacle.

5. The structure defined in claim 1, (e) a peripheral bead extending along the upper edges of said side and rear walls of said receptacle, and (f) a downwardly facing channel-defining structure carried by the lower edge portions of said hood structure and extending peripherally thereof and receiving said peripheral bead of said receptacle therein and positively engaging the same to positively secure said hood structure to said receptacle.

6. The structure defined in claim 1, (e) a bead extending peripherally of said receptacle along the upper edges of its said side and rear walls, (f) said hood structure having side and rear lower edges, and (g) a channel member carried by said hood structure at its said lower edges and extending peripherally of said hood structure, (h) said channel being of generally inverted U-shape considered cross-sectionally and having spaced mouth-defining portions and bottom-defining portions, (i) said mouth defining portions being more closely spaced than said bottom-defining portions, (j) said bead being received within said channel between said bottom-defining portions and inwardly of said mouth-defining portions.

References Cited in the file of this patent

UNITED STATES PATENTS

| | | |
|---|---|---|
| 916,864 | Henhapl | Mar. 30, 1909 |
| 996,200 | Betsworth | June 27, 1911 |
| 1,296,713 | Thieringer | Mar. 11, 1919 |
| 1,714,572 | Sears | May 28, 1929 |
| 2,639,711 | Smith et al. | May 26, 1953 |